May 21, 1968 K. J. NISPER ET AL 3,384,278
METHOD AND APPARATUS FOR SEPARATING THE SEGMENTS
OF SCORED PISTON RINGS
Filed Oct. 21, 1965 7 Sheets-Sheet 1

INVENTORS
KENNETH J. NISPER
DOUGLAS W. HAMM
BY
Price & Heneveld
ATTORNEYS

INVENTORS
KENNETH J. NISPER
DOUGLAS W. HAMM
BY
ATTORNEYS

INVENTORS
KENNETH J. NISPER
DOUGLAS W. HAMM
BY
ATTORNEYS

May 21, 1968        K. J. NISPER ET AL        3,384,278
METHOD AND APPARATUS FOR SEPARATING THE SEGMENTS
OF SCORED PISTON RINGS
Filed Oct. 21, 1965        7 Sheets-Sheet 5

INVENTORS
KENNETH J. NISPER
DOUGLAS N. HAMM
BY
*Price & Henveld*
ATTORNEYS

May 21, 1968  K. J. NISPER ET AL  3,384,278
METHOD AND APPARATUS FOR SEPARATING THE SEGMENTS
OF SCORED PISTON RINGS
Filed Oct. 21, 1965  7 Sheets-Sheet 7

INVENTORS
KENNETH J. NISPER
DOUGLAS W. HAMM
BY
*Price & Heneveld*
ATTORNEYS

United States Patent Office 3,384,278
Patented May 21, 1968

3,384,278
METHOD AND APPARATUS FOR SEPARATING THE SEGMENTS OF SCORED PISTON RINGS
Kenneth J. Nisper, Spring Lake, and Douglas W. Hamm, Muskegon, Mich., assignors to Muskegon Piston Ring Company, Muskegon, Mich., a corporation of Michigan
Filed Oct. 21, 1965, Ser. No. 500,042
9 Claims. (Cl. 225—2)

ABSTRACT OF THE DISCLOSURE

Apparatus for separating the segments of coiled piston ring stock having spaced straps along the inside diameter thereof and having the faces scored at predetermined intervals. A number of embodiments are illustrated including, basically, the contacting of the segment by a gear tooth, punch or the like which is operative to deform it sufficiently to cause a cracking at the score line. Other embodiments illustrate the forcing of the ring stock along an undulating path and the flexing of the diameter thereof both inwardly and outwardly to cause the ring stock to crack along the score lines. If necessary in the particular embodiment, the stock position is indexed via the spaced inside-diameter straps by means such as gears, pilot members or the like. It is understood that this abstract is not to be utilized to limit the scope of this invention.

Background

This invention relates to methods and apparatus for separating the scraper segments of scored piston ring stock during the manufacturing process.

It is preferable to coil, punch, and cross-sectionally shape, circumferentially compressible piston rings before dividing or separating the individual segmental sections. A heat treatable material is provided with laterally extending slots arranged at a predetermined spacing along the ribbon-like blank. Score lines are impressed into it at the ends of desired slots. These score lines may be terminated a short distance from the edge of the strip which is to form the circumferential margin of the finished product in accordance with teachings of application No. 361,297, filed Apr. 20, 1964, and entitled, Method of Making Piston Rings, and application No. 361,026, filed Apr. 20, 1964, entitled Piston Rings.

The ribbon-like strip is shaped, coiled, and heat treated to a brittle hardness. The scraper portions of the rings are then separated into segments at desired score lines by subjecting the area of the score line to circumferential tension in excess of the ultimate tensile strength of the material.

Objects and specification

It is an object of this invention to provide methods and apparatus whereby the coiled blank for piston rings of this type may be separated at selected score lines.

More specifically, it is an object of this invention to provide methods and apparatus for performing this operation which effect the required separation without breaking off or necking down the material adjacent the score line.

It is an object of this invention to provide methods and apparatus for performing the above outlined separation operation which are extremely accurate and, yet, capable of high-speed, mechanized execution.

These and other objects of this invention will be clearly understood by reference to the following specification and accompanying drawings in which:

According to the teachings of a first embodiment of this invention, the circular coil of piston rings to be separated is positioned in a separating channel defined by a plurality of rollers. A driving gear is positioned adjacent to the channel in such a manner that its toothed periphery meshes with the side straps of the ring and drives it longitudinally through the separation channel. A separating gear, which is mounted above the driving gear on the same shaft, rotates in fixed relation to the driving gear. The separating gear is so positioned that its teeth contact the ring material at the score marks and push it into the separation channel a sufficient distance to separate the material at the score line.

According to a second embodiment of this invention, the piston ring coil to be separated is sequentially forced through a separating channel bounded on either side by a plurality of laterally offset rollers. These rollers force the ring to be bent first in one direction and then the other. A sufficient number of rollers are provided to insure separation or rupture at each score line.

According to the teachings of a third embodiment of this invention, the piston ring coil to be separated is fed through a separation channel which has an aperture in one of its walls. A knife edged member is mounted for reciprocal movement in and out of the separation channel through the aperture. As each score line on the ring coil comes in line with the aperture, the knife edge is reciprocated into the channel a sufficient distance to separate the ring material at that particular score line.

According to the teachings of a fourth embodiment of this invention the piston ring coil to be separated is fed through a separating channel having apertures in opposite walls thereof. One adjacent wall of the separation channel is shaped as a die member which functions to maintain the relaxed spacing between the scraper facings. A punch enters the channel from either one or both sides of the ring striking one segment directly between the score lines on the material. The punch is extended into the cracking channel a sufficient distance to separate the ring material at the score lines.

According to the teachings of a fifth embodiment of this invention, the piston ring coil to be separated is hooped over two spaced rollers. A third roller, having its axis of rotation lying on the approximate perpendicular bisector of a line connecting the axes of rotation of the first two rollers, bears upon the face of the piston ring with sufficient pressure to either partially or completely separate the material at the score lines.

Figure 16:
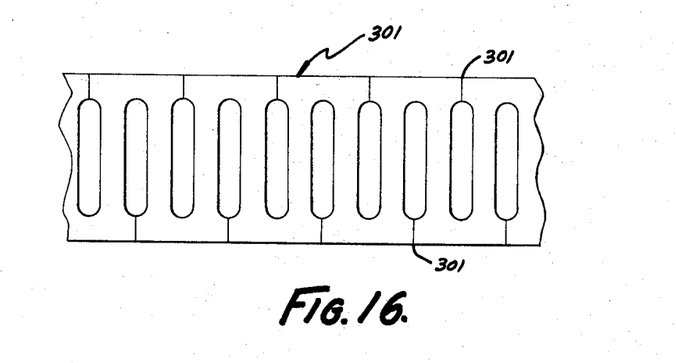
FIG. 16 is a plan view of the ribbon-like blank before it is shaped.
Figure 17:
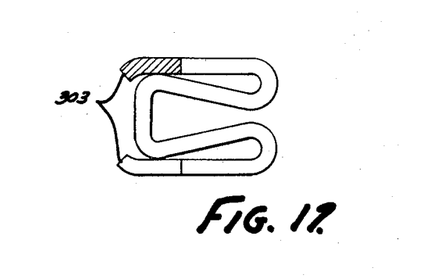
FIG. 17 is a cross-sectional view of the piston ring stock to which the teachings of this invention pertain.
Figure 18:
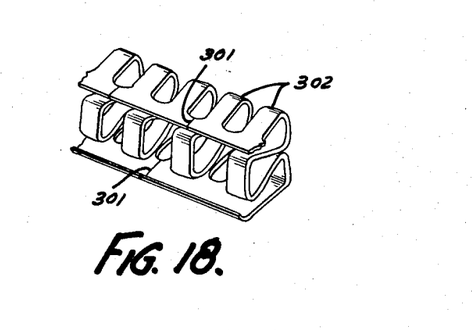
FIG. 18 is a perspective view of the piston ring stock to which the teachings of this invention pertain.

Referring initially to FIGS. 16 through 18 there is shown in FIG. 16 one type of ribbon-like blank 300 from which the piston ring stock is formed. The score lines indicated by reference numeral 301 are impressed into the blank at this stage of the fabrication procedure. In FIGS. 17 and 18 the piston ring stock has been formed by a shaping process from the blank. Reference numeral 302 indicates the straps of the ring stock while reference numeral 303 indicates the scraper faces.

FIGS. 16 through 18 are shown only as an aid to understanding the methods and machines which form the subject of this invention. The scope of this invention is not to be limited by the particular configuration of the piston ring stock shown in these figures. For example, the score lines 301 may be differently spaced and the ribbon-like blank may be punched in a different manner.

Referring now to FIGS. 1–4 one specific embodiment of this invention will be discussed in detail. A tubular stationary mandrel 1 having roller guides 2 and 3 mounted thereon is provided for supporting the coiled piston ring blank before and after the individual segments are separated. A base member 4 curved to fit over and seat upon a portion of the surface of the mandrel 1 is secured to the mandrel 1. The base member 4 is located approximately midway between the ends of the mandrel 1. The base member has an upstanding roller support 5. Base member 4 supports guide rollers 10, horizontal compression rollers 11, and vertical compression rollers 12. The rollers 10, 11 and 12 are all freely rotatable about their mountings. The vertical compression rollers 12 are mounted to the roller support. The horizontal compression rollers 11 are mounted to the base member 4. The rollers 11 and 12 and the base member are arranged in such a manner that three sides of a separating channel 13 are formed thereby (See FIG. 2). An operating gear assembly 20 forms the fourth side of the separating channel 13. The operating gear assembly 20 includes a driving gear 22 and a separating gear 23. The separating gear is slightly smaller in diameter than the driving gear to insure positive positioning and driving of the piston ring stock.

Figure 1:
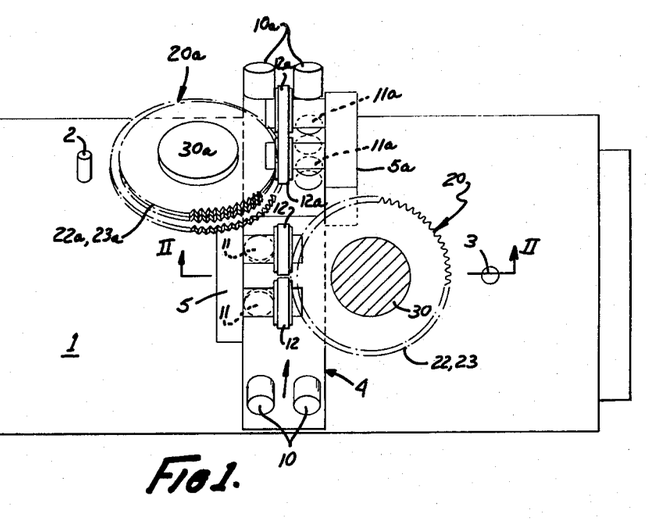
FIG. 1 shows a plan view of a first embodiment of this invention.

Mounted on the base member 4 is a second assembly having the same construction. The corresponding parts of this assembly are identified by the letter a. The separating channels for the two assemblies are aligned but the corresponding items of equipment are positioned on opposite sides of the piston ring blank as it passes through the separating channels. In the preferred embodiment of this invention, the operating gear assembly 20 is driven but the operating gear assembly 20a is not powered. Gear 22a serves as an indexing or coordinating gear to insure that separating gear 23a contacts the piston ring stock only at the score lines.

Figure 2:
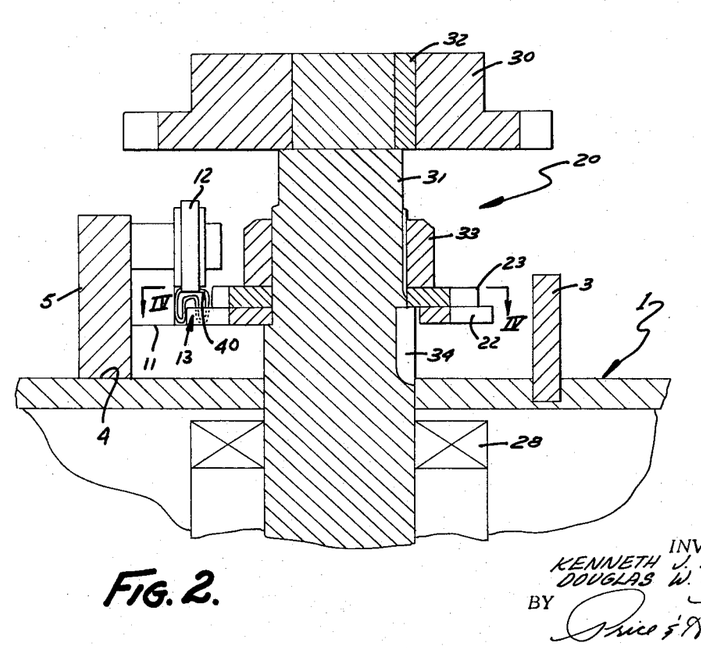
FIG. 2 shows a cross-sectional view taken along line II—II of FIG. 1.

As seen best in FIG. 2, operating gear assembly 20 comprises a driving gear 22 and a separating gear 23. The driving and separating gears have driving and separating teeth relatively disposed about their peripheries at intervals determined by the characteristics of the particular piston ring blank being separated. These teeth extend into the separating channel for a distance which is also determined by the characteristics of the particular piston ring blank being separated. For any given coil of piston ring blank to be separated, the pitch of the drive gear should be such that it will mesh with the side straps of the ring; the pitch of the separating gear should equal the circumferential segment length of the ring; and, the teeth of the separating gear should be of sufficient diameter that their ends extend into the separating channel or ring path far enough to separate the scraper segments when the ring passes therethrough (see FIG. 4).

The driving gear 22 is affixed to a shaft 31 (FIGS. 2 and 3) one end of which extends into and is appropriately journaled at 28 within the tubular housing 1. It will be recognized by those skilled in the art that a variety of well known journaling arrangements could be utilized. The power pulley or sprocket 30 is secured to the top of shaft 31 utilizing a key 32 in a well known manner. Driving gear 22 is also keyed to shaft 31 as illustrated. Separating gear 23 is held rigidly against driving gear 22 by collar 33. Preferably, some means are provided for adjusting the radial displacement of the separating gear with respect to the drive gear so that the separating gear teeth 26 will always accurately align with the marks on the ring material when the apparatus is in operation. A system of slots 26 and screws 27 in the face of the gears has proved satisfactory for this purpose (See FIG. 4). Conveniently, the top screws 27 may thread directly into tapped holes in the driving gear 22.

The arrangement of the operating gear assembly 20a is basically similar to that described in connection with the operating gear assembly 20 except that the shaft 30a may be stationarily mounted upon the tubular member and bearings provided within the gear assembly 20a since the shaft 30a is not powered. The gear 22a acts as an index or as a rotating guide to position accurately the teeth on the separating gear 23a with respect to the score marks. Again, preferably, some means should be provided to adjust the relative circumferential displacement of separating gear 23a with respect to index gear 22a to insure that the separating gear teeth 26a fall precisely upon a score line as the idler gear 22a is rotated by the advancing piston ring. Once the relative circumferential positions of the two gears have been adjusted, they must remain rigidly affixed with respect to one another.

Figures 3, 4:
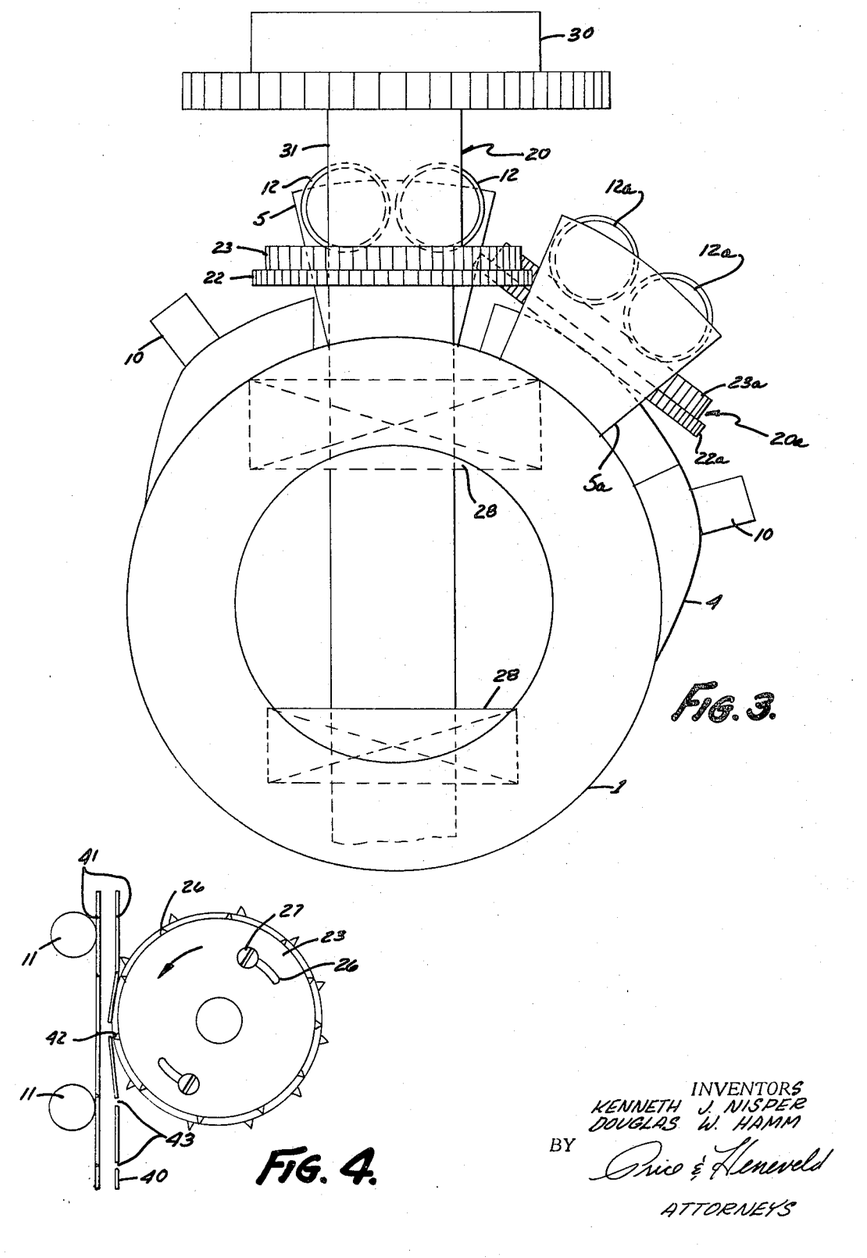
FIG. 3 is an end view of the device shown in FIG. 1.
FIG. 4 is a cross-sectional view taken along line IV—IV of FIG. 2.

In operation, a coil of unseparated ring blank of the type illustrated in FIG. 18 is placed on mandrel member 1 and one end thereof is threaded through the separating channels 13 and 13a via the guides 10. The drive gear 22 engages the straps of the ring blank at the radially inner portion of the ring stock and drives the coil through the device. The driving gear 22 and the cooperating horizontal compression rollers 11 are spaced such that the pressure from the teeth of the separating gear 22 bends the ring stock sideways at a point approximately half way between the horizontal compression rollers 11. The point of each separating gear tooth 26, as shown in FIG. 4, falls precisely on a score line 41 and forces the side of the ring into the separating channel between the compression rollers 11 until the stress causes the ring material to separate or rupture on the score line on the side of the ring blank adjacent the teeth 26. Vertical compression rollers 12 hold the ring down against the base member 4 during this process. The same operation is performed by the operating gear assembly 20a. The operating gear assembly 20 separates the segments on one side of the ring blank while the operating gear assembly 20a separates them on the other side. The straps of the ring stock at the inside diameter are sufficiently uniform to insure that the separating gear teeth will repeatedly contact the ring blank precisely at the score lines when the separating gear is in proper radial adjustment with respect to the driving or index gear.

The device is mounted on a base together with a motor and possibly a variable speed drive. The variable speed drive transmits power to the power pulley or gear 30 by any suitable means such as a belt or chain.

While operating gear assembly 20a has been illustrated as non-powered it will be understood by those skilled in the art that, by gearing the assemblies 20 and 20a, the gear assembly 20a could also be powered to furnish part of the power required to drive the ring blank through the cracking channel.

Referring now to FIGS. 5–8 a second embodiment of this invention will be discussed in detail. A base member 51 has an upstanding support member 52 mounted thereon which in turn supports the stationary tubular mandrel 50. The coil of ring blank 60 to be separated is wrapped around the lower side of the mandrel 50 as viewed in FIG. 5. Mounted on upstanding support member 52 are a shaft 71, a driving gear 70, and a power pulley or sprocket 72. The shaft 71 is mounted for rotation with respect to upstanding support member 52 by suitable bearing means (not shown).

A section of the mandrel 50 below driving gear 70 is cut away (FIG. 7) in such a manner that a support roller 73 mounted for free rotation on the shaft 75 can be positioned in close proximity to and vertically aligned with the driving gear 70. The sprocket 72 and the driving gear 70 are, of course, rigidly mounted to shaft 71 so that rotational thrust may be transmitted from the sprocket to the ring stock driving gear.

Figures 7, 8:
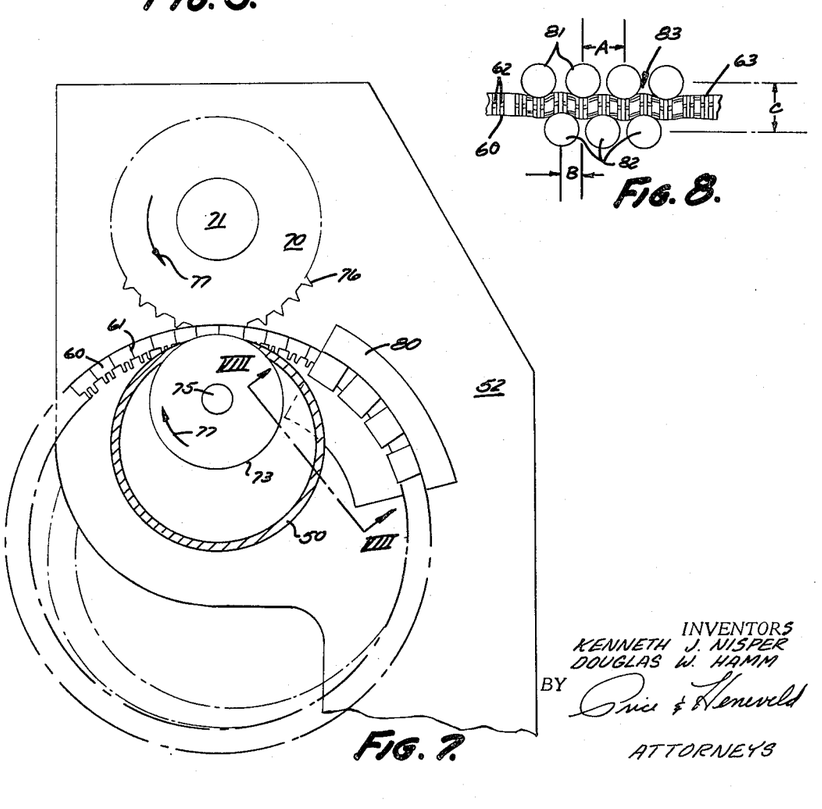
FIG. 7 is an enlarged view of the driving and separating mechanism of the device shown in FIG. 5.
FIG. 8 is a cross-sectional view taken along line VIII—VIII of FIG. 7.

A curved, stationary flange 80 is rigidly secured to the support member 52. As best viewed in FIGS. 6 and 7 this flange preferably has a radius of curvature approximately equal to that of the coil of piston ring stock to be separated. Disposed on and beneath the flange 80 are a plurality of laterally offset right hand rollers 81 and left hand rollers 82. These rollers are positioned generally as shown in FIG. 8 to form an undulating separation channel 83. The relative spacing of rollers 81 and 82 is governed, of course, by the characteristics of the particular piston ring to be separated so these rollers are preferably adjustably mounted on flange 80 for relocation both laterally and longitudinally of the ring stock. FIG. 8 shows one relative spacing sequence which has been found to operate satisfactorily. The left hand rollers 82 are positioned in such a manner that they are offset from the right hand rollers 81 by one-half the center line distance of the rollers. Thus, on the drawings as dimensioned, B equals A/2. The center line distance C between the left and right hand rollers should be somewhat less than the roller's diameter plus the width of the ring blank.

Figure 5:
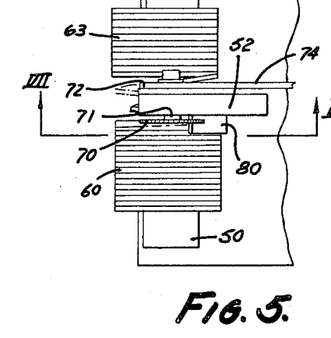
FIG. 5 is a plan view of a second embodiment of this invention.
Figure 6:
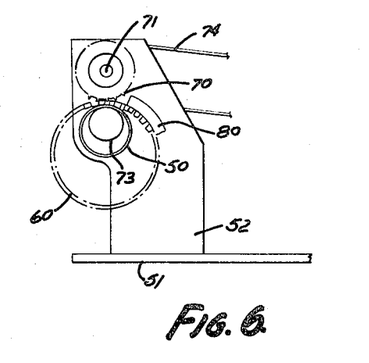
FIG. 6 is a side elevation view of the device shown in FIG. 5.

In operation, the coil of ring blank or stock 60 to be separated is wrapped loosely about the bottom end of tubular member 50 as shown in FIG. 5. The inside end of the coil 60 is threaded between drive gear 70 and support roller 73 in such a manner that the teeth 76 of the drive gear grip the straps 62 of the blank and drive it into and through separating channel 83. Thus, the driving gear and the support roller turn in the direction indicated by arrows 77. As the coil 60 enters separating channel 83, the right and left hand rollers 81 and 82 force the ring to be stressed first in one direction and then in the other as demonstrated by FIG. 8. A sufficient number of right and left hand rollers are provided to positively stress the material of the blank sufficiently to cause separation at every score mark 61. The action of the rollers is to repeatedly and oppositely flex the blank until rupture occurs by reason of fatigue. The sector 63 of the coil which has been separated is then fed onto the receiving end of tubular member 50 which is the upper portion as viewed in FIG. 5. Should a tendency exist for the sector of the coil undergoing the separating operation to jump out of the separation channel, a confining roller, or rollers, may be rotatably positioned on the open side of the channel.

The cracking apparatus is driven by means of a belt or chain 74 which is preferably attached to a variable speed drive and a motor. The latter are not illustrated since they are of well known conventional design.

Figure 9:
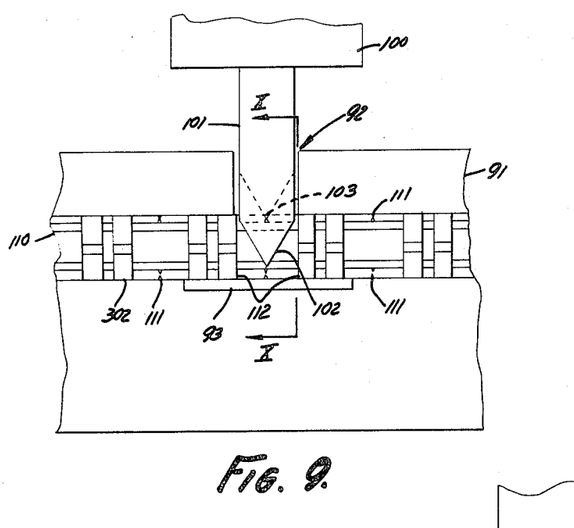
FIG. 9 is a side elevation view of a third embodiment of this invention.
Figure 10:
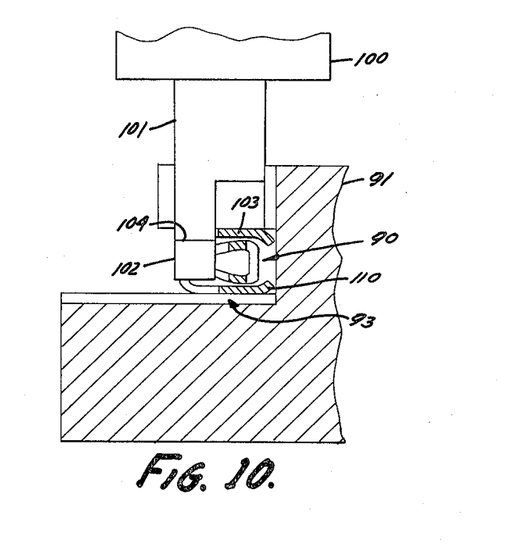
FIG. 10 is a cross-sectional view taken along line X—X of FIG. 9.
Figure 11:
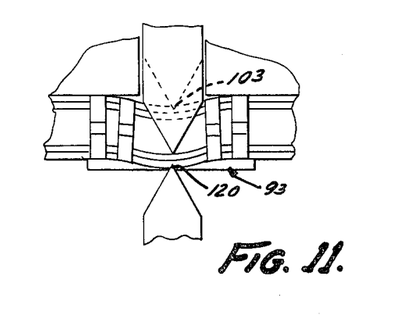
FIG. 11 shows a modification of the device shown in FIG. 9.

Referring now to FIGS. 9, 10 and 11 a third embodiment of this invention will be discussed in detail. A generally U-shaped separation channel 90 having cross-sectional dimensions approximating those of the ring blank to be processed, is formed in the stationary bed 91. This channel 90 is preferably curved on a radius equal to that of the coil of piston ring blank to be processed. An aperture 92 is provided as shown in one side so that access may be gained to the side of the separation channel. Opposite from aperture 92 the bed contains a relief area 93. Preferably, relief area 93 is about two ring pitch lengths long.

A punch 101 extends through the aperture 92 in the separation channel 90. The punch is reciprocated by suitable means such as a cylinder, cam or solenoid, here generally indicated by the numeral 100. The extremity of punch 101 is machined to form a generally V-shaped pilot 102, and a generally V-shaped cracking die 103. As may be seen in FIGS. 9 and 10 the cracking die 103 is so positioned that it does not extend as far into the separation channel as does the pilot 102. The width of the shank 104 of the pilot 102 and the aperture 92 are determined by the distance indicated at 112 between the ring straps on the particular piston ring coil being processed.

In operation, a coiled piston ring blank which has been scored at 111 is fed through the separation channel until two straps 302 are positioned on either side of pilot 102. The punch 101 is then reciprocated moving the pilot 102 into the separation channel. As pilot 122 enters the separation channel it positions the ring 110 precisely by sliding between and against the ring straps 302 in such a manner that cracking die 103 exactly aligns with and directly contacts a score mark 111 on the ring blank material. The punch 101 is driven into the separation channel a sufficient distance to stress the ring blank material at the score line overlying the relief 93 beyond its ultimate tensile strength, and thus effect segment separation. Some means, such as stationary tubular members, are preferably provided for storing the coiled piston ring stock before and after it has passed through the separation channel.

The apparatus shown in FIG. 11 is identical to that shown in FIGS. 9 and 10 with the exception that a second cracking die 120 is provided which slightly protrudes from the base of aperture 93. Cracking die 120 is directly aligned with cracking die 103 and extends into relief 93 a sufficient distance to contact the blank at a score line 111 immediately prior to separation at that point. For some types of piston rings this modification insures cleaner and more positive segment separation.

Figure 12:
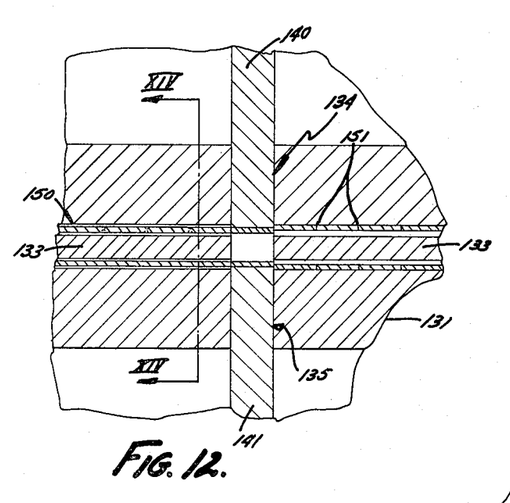
FIG. 12 is a cross-sectional view of a fourth embodiment of this invention showing the separating punches in closed position.
Figure 13:
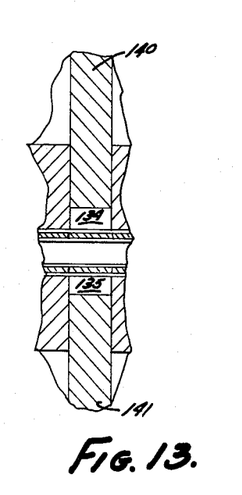
FIG. 13 is similar to FIG. 12 except that the separating punches are shown retracted.
Figure 14:
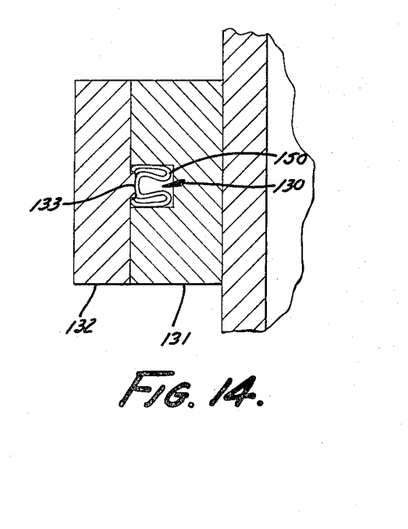
FIG. 14 shows a cross-sectional view taken along line XIV—XIV of FIG. 12.

Referring now to FIGS. 12, 13 and 14, a fourth embodiment of this invention will be discussed in detail. A separation channel 130 having cross-sectional measurements approximating those of the ring stock to be processed is formed by bed plates 131 and 132. This channel preferably takes the form of a circular segment having a radius of curvature approximately equal to that of the coil of piston ring stock to be processed. Bed plate 132 has a ridge 133 extending into the separation channel as shown in FIG. 14. This ridge may run the entire length of the separation channel 130 except that it must be discontinued within apertures 134 and 135 in the sides of the separation channel so as to allow the segments to be pressed into the channel. The apertures 134 and 135 are aligned on opposite sides of the channel. Punch members 140 and 141 are mounted for reciprocating movement into and out of the separation channel via apertures 134 and 135. Punches 140 and 141 are preferably square or rectangular in cross-section and are closely fitted in apertures 134 and 135. The width of the punch working face closely approximates the segment distance between score lines 151 at which the ring material is desired to be separated. If desired punches 140 and 141 may be equipped with indexing dies to insure proper positioning of the ring stock in the channel. In operation, the piston ring stock 150 to be separated is propelled through separation channel 130. Means are preferably provided for holding the coil before and after it passes through the separation channel. Each time a segment of the ring periphery is positioned directly in line with apertures 134 and 135, the feed device propelling the ring stock is deactivated. Punches 140 and 141 are reciprocated by means such as a cam, hydraulic cylinder or solenoid (not shown) into the separation channel as shown in FIG. 12. The punches 140 and 141, in cooperation with the ridge 133, stress the ring material at score marks 152 until separation occurs. When the separation is completed, punches 140 and 141 are retracted and the ring stock 150 is advanced until another segment area is aligned with apertures 134 and 135. Note that if ridge 133 extends on both sides of the apertures, it is necessary only to punch every other segment in order to achieve total separation.

Figure 15:
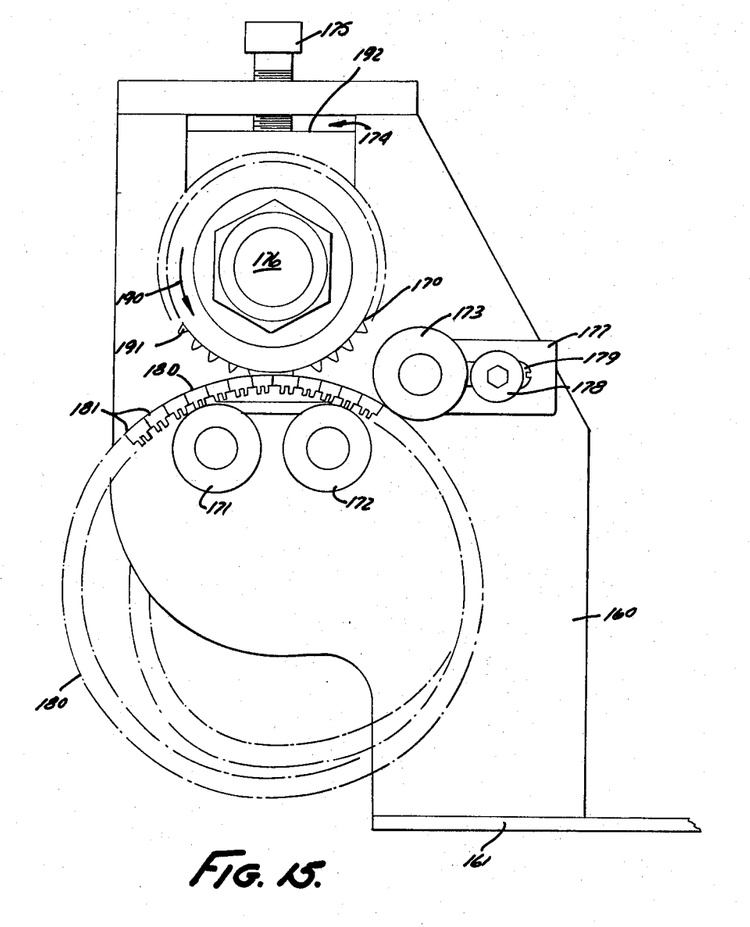
FIG. 15 shows a side elevational view of a fifth embodiment of this invention.

Referring now to FIG. 15, a fifth embodiment of this invention will be discussed in detail. The support 160 rises from a base 161. The base 161 may be common to the driving equipment (not shown). Affixed to one side of the housing 160 is the drive gear 170 having teeth 191. The pitch of the drive gear is such that its teeth will mesh with the radial portions of the straps on the coil of piston ring stock to be processed. The drive gear 170 is rigidly affixed to a shaft 176 which is journaled in support housing 160 by suitable bearing means (not shown). Some means is provided for transmitting rotational thrust to the shaft 176 such as another gear, pulley or sprocket. Also mounted on the side of support housing 160 by means of stud shafts are separating rolls 171 and 172. The separating rolls are freely rotatable on their stud shafts. The relative positioning of the drive gear 170 and the separating rolls 171 and 172 is such that lines connecting the centers of these mechanisms form an isosceles triangle, the base of which lies between the centers of separating rollers 171 and 172.

Positioned to the right of and above separating rollers 171 and 172 is another separating roller 173. It is also mounted on a stud shaft about which it is freely rotatable. Preferably, the stud supporting separating roller 173 is affixed to an adjustment pltae 177 having a slot 179 therein. The separating roller 173 may then be selectively positioned by means of a fastening device such as the cap screw 178 which anchors the plate 177 to the support 160.

A vertical adjustment means is also provided for drive gear 170. This adjustment means, as shown, comprises a guide channel 174 enclosed or retained in support 160, adjustment block 192 positioned within the guide channel, and means such as the cap screw 175 for selectively raising and lowering the adjustment block. The shaft 176 of the drive gear is journaled in adjustment block 192 by well known means (not shown).

In operation, one sector of the coil of piston ring stock to be separated is hooped over separating rolls 171 and 172 and drive gear 170 is brought into meshing relationship with its outer diameter straps. Between the separating rolls 171 and 172 the stock forms a convex arch. The drive gear 170 is then lowered a sufficient distance to partially flatten this arch placing a radial bending stress on the stock sufficient to separate or rupture the stock at the scores 181 as they pass thereunder with the drive gear rotated in the direction of the arrow 190. The segments may be entirely separated during this initial operation. Preferably, however, drive gear 170 is lowered only far enough to provide sufficient radial stress to separate the periphery of the stock at the score line from its point of origination on the inside diameter to a point which lies about half way between radial extremities of the score lines. Separating roller 173 is then moved into operative engagement with the stock by sliding adjustment plate 177 to the left as it is viewed in FIG. 15. Separating roller 173 is positioned such that it bends the stock downwardly at a greater angle than that which the stock would normally travel were the roller 173 omitted. Drive gear 170, the position of which is now fixed, acts effectively as an immoveable load while separating rollers 171 and 172 act as fulcrums. Separating roller 173 is moved far enough to the left to place an outside diameter to inside diameter radial bending stress upon the stock of sufficient magnitude to complete the segment separation. By completing the separation process in two steps instead of one, it is possible to obtain more positive and accurate separation.

Some means such as a tubular cylinder is preferably provided for supporting the coil of ring stock before and after it is passed between the separating rollers. It will be apparent to those skilled in the art that drive roller 170 could be replaced by another separating roller such as shown at 171, 172 or 173, provided some other means is furnished to propel the stock. This is within the spirit of this invention. In the preferred embodiment, the driving gear 170 is continually rotated until a complete coil of ring stock has passed thereunder. All of the several embodiments of this invention are capable of operating fully automatically on a continuous ribbon of stock.

While several preferred embodiments of this invention have been described together with minor modifications, it will be recognized that other modifications may be made without departing from the scope and spirit of the invention. Such modifications are to be deemed as included within the scope of the following claims unless these claims, by their language expressly state otherwise.

We claim:
1. Apparatus for separating the segments of coiled scored piston ring stock, said stock being an elongated ribbon of generally rectangular cross-section and predetermined width, having along at least one face thereof spaced straps at predetermined intervals, the score lines being on two opposite faces of said stock generally normal to the face having said straps, said apparatus comprising:
   a separation channel;
   a first aperture in one wall of said separation channel;
   a tool mounted for reciprocating movement into and out of said separating channel through said aperture; and
   means for reciprocating said tool; and means operative in conjunction with the spacing of said straps for indexing said stock within said channel to a predetermined position during reciprocation of said tool.

2. Apparatus for separating the segments of coiled scored piston ring stock, said stock being an elongated ribbon of generally rectangular cross-section and predetermined width having along at least one face thereof spaced straps at predetermined intervals, the score lines being on two opposite faces of said stock generally normal to the face having said straps, said apparatus comprising:
   a separation channel;
   a first aperture in one wall of said separation channel;
   a relief in the side of said channel opposite from said aperture;
   a tool mounted for reciprocating movement into and out of said separating channel through said aperture, said tool having a knife edge and a generally V-shaped pilot member mounted on the inner extremity thereof, said guide member extending into said channel beyond said knife edge and operative in conjunction with the straps on said ring to center said score mark under said knife edge as said tool reciprocates inwardly; and
   means for reciprocating said tool.

3. The combination as set forth in claim 2 which further comprises a second knife edge positioned in said relief.

4. The combination as set forth in claim 1 in which said tool has a punch mounted on the inner extremity thereof, said punch having a working face approximately equal in width to the ring stock segment desired to be separated.

5. The combination as set forth in claim 4 which further comprises a die member positioned within said channel on a wall thereof adjacent the wall containing said first aperture, said die member extending to the edge of said first aperture and having a wall width equal to the distance between the ring stock scraper faces.

6. The combination as set forth in claim 5 which further comprises:
 a second aperture in said separation channel aligned with and opposite from said first aperture; and
 a second tool mounted for reciprocating movement into and out of said separating channel through said second aperture, said second tool having a second punch mounted on the inner extremity thereof, said second punch having a working face approximately equal in width to the ring segment desired to be separated.

7. Apparatus for separating the segments of coiled scored piston ring stock, said stock being an elongated ribbon of generally rectangular cross-section and predetermined width, having along at least one face thereof spaced straps at predetermined intervals the score lines being on two opposite faces of said stock generally normal to the face having said straps, said apparatus comprising:
 a separation channel;
 means engaging said ring stock for propelling the ring stock to be separated through said channel;
 means cooperating with said channel for successively subjecting the ring material at the score lines to tension in excess of the material's ultimate tensile strength at that point;
 means operative in conjunction with the spacing of said straps for indexing said stock within said channel to a predetermined position prior to each activation of said subjecting means; and
 means for receiving said ring stock as an elongated ribbon subsequent to its sequential passage through said channel.

8. A method of separating the flange segments of coiled piston ring stock, said stock being an elongated ribbon of generally rectangular cross section and having along the inside diameter thereof a series of straps spaced at predetermined intervals, said method having the steps of:
 providing a plurality of score lines on the faces of said stock generally normal to the inside diameter thereof;
 propelling said stock sequentially into operative relationship with a flange segment separating mechanism;
 indexing the position of said stock with respect to said separating mechanism by means of the spacing of said straps;
 successively subjecting the stock at the score lines to a load in excess of its ultimate tensile strength at that point subsequent to indexing thereof to separate the flange segments one from another while retaining the elongated ribbon characteristics of said ring stock; and
 continuing the sequential movement of said stock out of said mechanism as an elongated ribbon after sequentially subjecting it at the score lines to a load in excess of its ultimate tensile strength.

9. The method as set forth in claim 8 which further comprises the step of removing the stock in its elongated ribbon form from said mechanism for further processing.

References Cited

UNITED STATES PATENTS

| | | | |
|---|---|---|---|
| 1,874,786 | 8/1932 | Mitchell | 225—105 |
| 1,975,155 | 10/1934 | Keller | 225—96 |
| 2,305,276 | 12/1942 | Rushmore | 225—104 X |
| 2,453,805 | 11/1948 | Melborn | 225—98 |
| 3,149,765 | 9/1964 | Horning et al. | 225—2 X |
| 3,206,088 | 9/1965 | Meyer et al. | 225—2 |

FOREIGN PATENTS

| | | |
|---|---|---|
| 870,487 | 12/1953 | Germany. |

JAMES M. MEISTER, *Primary Examiner.*